(12) United States Patent
Chu et al.

(10) Patent No.: US 12,332,458 B2
(45) Date of Patent: Jun. 17, 2025

(54) VEHICLE SYSTEM HAVING VARIABLE OPACITY

(71) Applicant: GM GLOBAL TECHNOLOGY OPERATIONS LLC, Detroit, MI (US)

(72) Inventors: Benjamin Chu, Royal Oak, MI (US); Victor Wong, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 422 days.

(21) Appl. No.: 17/940,534

(22) Filed: Sep. 8, 2022

(65) Prior Publication Data

US 2024/0085716 A1    Mar. 14, 2024

(51) Int. Cl.
*G02B 27/28* (2006.01)
*B60J 3/06* (2006.01)

(52) U.S. Cl.
CPC .............. *G02B 27/281* (2013.01); *B60J 3/06* (2013.01)

(58) Field of Classification Search
None
See application file for complete search history.

(56) References Cited

U.S. PATENT DOCUMENTS 8,382,200 B2 *    2/2013    Mathes ................ B60J 3/06
296/214

FOREIGN PATENT DOCUMENTS

DE    4327095 A1    7/1994
JP    2018153395 A    10/2018

OTHER PUBLICATIONS

German Office Action for German Application No. 102023109950.7; dated Jul. 12, 2024.

* cited by examiner

*Primary Examiner* — Robert E. Tallman
(74) *Attorney, Agent, or Firm* — CANTOR COLBURN LLP (57) ABSTRACT

A system for providing variable opacity includes a polarization assembly disposed at a vehicle. The polarization assembly includes a first panel having a plurality of first polarizing elements, and a second panel having a plurality of second polarizing elements, the first panel and the second panel overlapping in a path of light incident on the vehicle. The system also includes an actuation device configured to linearly translate the first panel relative to the second panel between a first position in which the polarization assembly is transparent to the light and a second position in which the polarization assembly at least partially blocks the light.

20 Claims, 8 Drawing Sheets

VEHICLE SYSTEM HAVING VARIABLE OPACITY

INTRODUCTION

The subject disclosure relates to vehicle systems, and more particularly to regulation or control of illumination in a vehicle.

External light conditions can have an effect on various aspects of vehicle operations. For example, thermal conditions such as excessive heat in a vehicle can arise due to sunlight exposure and can have negative effects, such as increased power consumption, decreased operating efficiency and a negative user driving experience. In addition, glare and reflection can decrease visibility as well as the ability of a user to properly operate the vehicle. Thus, effective management of the effects of external light conditions is desirable.

SUMMARY

In one exemplary embodiment, a system for providing variable opacity includes a polarization assembly disposed at a vehicle. The polarization assembly includes a first panel having a plurality of first polarizing elements, and a second panel having a plurality of second polarizing elements, the first panel and the second panel overlapping in a path of light incident on the vehicle. The system also includes an actuation device configured to linearly translate the first panel relative to the second panel between a first position in which the polarization assembly is transparent to the light and a second position in which the polarization assembly at least partially blocks the light.

In addition to one or more of the features described herein, the plurality of first polarizing elements defines a first polarization pattern, and the plurality of second polarizing elements defines a second polarization pattern, each of the first polarization pattern and the second polarization pattern including a first polarization and a second polarization perpendicular to the first polarization.

In addition to one or more of the features described herein, the first polarization pattern fully aligns with the second polarization pattern when the polarization assembly is in the first position. The polarization assembly entirely blocks the light, and the first polarization pattern is fully unaligned with the second polarization pattern, when the polarization assembly is in the second position.

In addition to one or more of the features described herein, the actuation device is configured to perform the linear translation to put the polarization assembly in an intermediate position in which the first polarization pattern partially aligns with the second polarization pattern, and the polarization assembly partially blocks the light.

In addition to one or more of the features described herein, each of the first polarization pattern and the second polarization pattern alternates between the first polarization and the second polarization.

In addition to one or more of the features described herein, each of the first polarization pattern and the second polarization pattern alternates between the first polarization and the second polarization in a direction parallel to a direction of the linear translation.

In addition to one or more of the features described herein, the actuation device is configured to control an amount of the light passing through the polarization assembly based on an offset between the first panel and the second panel, the offset being in a direction parallel to a direction of the linear translation.

In addition to one or more of the features described herein, the system further includes a processing device configured to control the actuation device based on at least one of an input by a user, and an input by a vehicle system.

In addition to one or more of the features described herein, each of the first panel and the second panel is made from a transparent material, and each of the first panel and the second panel is individually transparent to the light.

In addition to one or more of the features described herein, the polarization assembly is configured to be disposed at a roof section of the vehicle.

In another exemplary embodiment, a method of providing variable opacity includes controlling a polarization assembly disposed at a vehicle, the polarization assembly including a first panel having a plurality of first polarizing elements, and a second panel having a plurality of second polarizing elements, the first panel and the second panel overlapping in a path of light incident on the vehicle. The controlling including operating an actuation device to linearly translate the first panel relative to the second panel between a first position in which the polarization assembly is transparent to the light and a second position in which the polarization assembly at least partially blocks the light.

In addition to one or more of the features described herein, the plurality of first polarizing elements defines a first polarization pattern, and the plurality of second polarizing elements defines a second polarization pattern, each polarization pattern including a first polarization and a second polarization perpendicular to the first polarization.

In addition to one or more of the features described herein, the first polarization pattern fully aligns with the second polarization pattern when the polarization assembly is in the first position. The the polarization assembly entirely blocks the light, and the first polarization pattern is fully unaligned with the second polarization pattern, when the polarization assembly is in the second position.

In addition to one or more of the features described herein, each polarization pattern alternates between the first polarization and the second polarization.

In addition to one or more of the features described herein, the controlling is performed based on at least one of: an input by a user, and an input by a vehicle system.

In addition to one or more of the features described herein, the polarization assembly is disposed at a roof section of the vehicle.

In yet another exemplary embodiment, a vehicle system includes a polarization assembly disposed at a vehicle. The polarization assembly includes a first panel having a plurality of first polarizing elements, and a second panel having a plurality of second polarizing elements, the first panel and the second panel overlapping in a path of light incident on the vehicle. The vehicle system also includes an actuation device configured to linearly translate the first panel relative to the second panel between a first position in which the polarization assembly is transparent to the light and a second position in which the polarization assembly at least partially blocks the light.

In addition to one or more of the features described herein, the plurality of first polarizing elements defines a first polarization pattern, and the plurality of second polarizing elements defines a second polarization pattern, each polarization pattern including a first polarization and a second polarization perpendicular to the first polarization.

In addition to one or more of the features described herein, the first polarization pattern fully aligns with the second polarization pattern when the polarization assembly is in the first position. The polarization assembly entirely blocks the light, and the first polarization pattern is fully unaligned with the second polarization pattern, when the polarization assembly is in the second position.

In addition to one or more of the features described herein, each polarization pattern alternates between the first polarization and the second polarization.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for control of illumination or lighting levels in a vehicle or other context. An embodiment of a variable opacity system or illumination control system includes a polarization assembly and an actuation device (i.e., an actuator). The polarization assembly includes a first panel having a plurality of first polarizing elements, and a second panel overlaid on the first panel and having a plurality of second polarizing elements. The polarizing elements may be strips, sheets or other shapes of transparent material, and each polarizing element has a defined polarization. The elements in each panel form a polarization pattern having two or more different polarizations. For example, each panel has a pattern that alternates between a first polarization, and a second polarization that is perpendicular to the first polarization.

The actuator is configured to linearly translate the first panel relative to the second panel to selectively change an opacity of the polarization assembly or change an amount of light that can pass through the polarization assembly. The first and second panels may be moved between a first position in which the polarization assembly is transparent to light and a second position in which the polarization assembly is at least partially transparent. The polarization assembly may also have one or more intermediate positions in which the assembly is partially transparent (e.g., portions of the assembly are transparent, and other portions are opaque).

Embodiments described herein present numerous advantages and technical effects. The embodiments address challenges related to management of thermal and illumination conditions in vehicles and facilitate vehicle operation, as well as provide an improvement to passenger and driver experience. For example, the embodiments provide for improved thermal management of the interior of a vehicle by controlling the amount of light entering a vehicle cabin or other interior space. This is desirable in many types of vehicles, including electric vehicles that feature glass roofs.

The embodiments also provide mechanisms for controlling illumination that are less complex and require less power consumption than existing solutions, as the polarization assemblies described herein can maintain polarization settings without requiring constant power consumption. This is advantageous, for example, in electric vehicles and other vehicles that have controllable privacy settings in which different opacity levels can be maintained. Such vehicles typically require battery power to maintain privacy settings, which can deplete batteries when the vehicles are parked for extended periods of time. Embodiments provide a solution in that the embodiments can maintain such privacy settings without drawing battery power.

The embodiments are not limited to use with any specific vehicle or device or system, and may be applicable to various contexts. For example, embodiments may be used with automobiles, trucks, aircraft, construction equipment, farm equipment and other vehicles. Embodiments may also be used with buildings, residences and other structures for regulating light and increasing the efficiency of environmental control systems (e.g., by reducing burden on cooling and heating).

Figure 1:
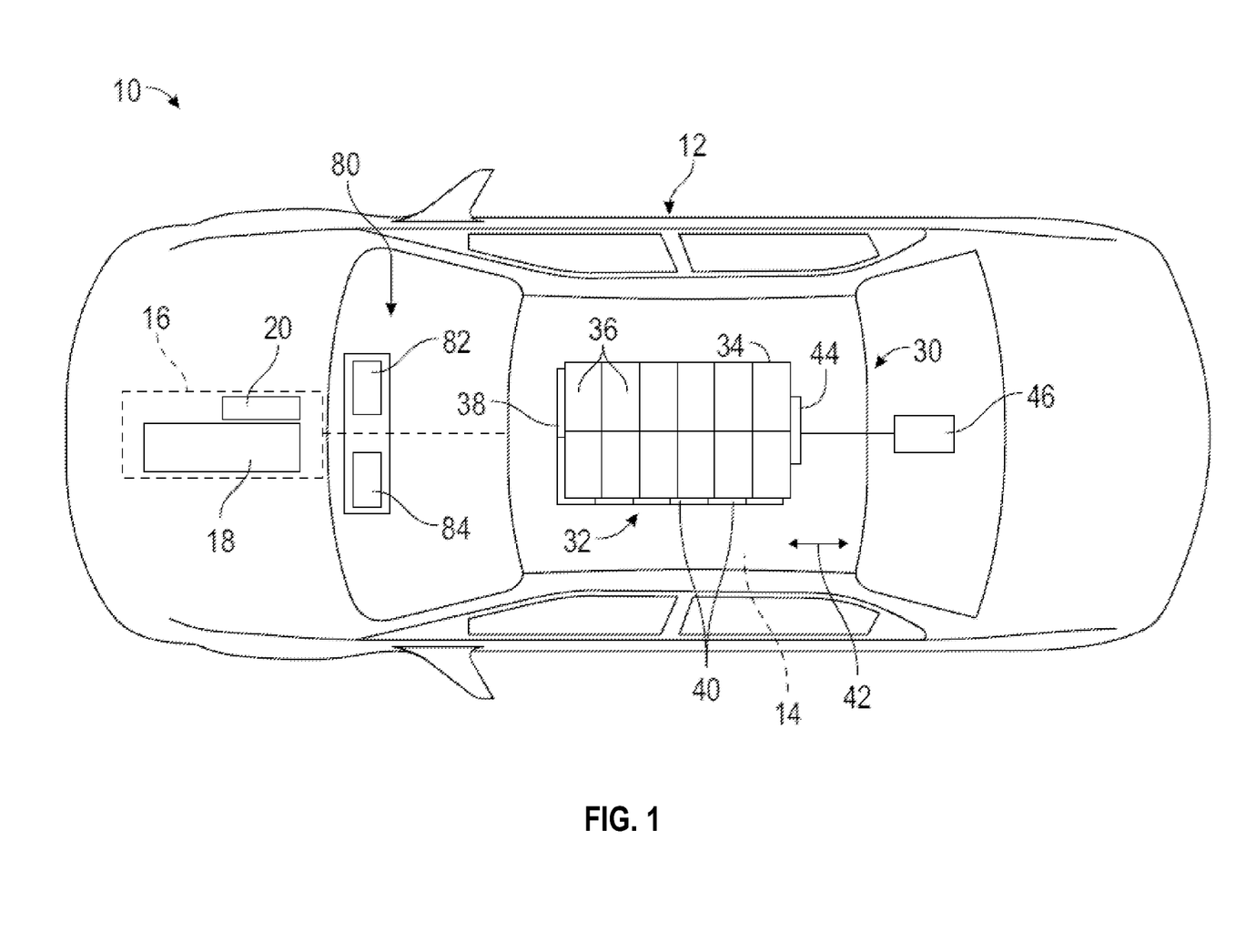
FIG. 1 is a top view of a motor vehicle including a system for providing variable opacity, the system including a polarization assembly, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid electric vehicle (HEV). In an example, the vehicle 10 is a hybrid vehicle that includes a combustion engine system 18 and an electric motor system 20.

The vehicle 10 also includes a computer system 80 that includes one or more processing devices 82 and a user interface 84. The various processing devices and units may communicate with one another via a communication device or system, such as a controller area network (CAN) or transmission control protocol (TCP) bus. The system 80 and/or processing device(s) 82 can be used to perform aspects of the methods discussed herein.

The vehicle 10 also includes an opacity control or illumination control system 30 that is configured to control the opacity and transparency of a portion or section of the vehicle 10 (e.g., a roof section or sun-roof). The opacity control system 30 includes a polarization assembly 32 having at least two sets of linearly polarized material. Each set is referred to as a "panel", which may form a flat or curved planar structure but is not so limited. A panel may have any shape, thickness or dimension suitable for providing illumination control as described herein.

A first panel 34 of polarized material has a first polarization pattern defined, for example, by a plurality of first polarizing elements 36. A second panel 38 of polarized material has a different polarization pattern (referred to as a "second polarization pattern") defined, for example, by a plurality of second polarizing elements 40. A panel or element may be a single layer of polarized material (e.g., glass or plastic) or may be multiple layers (e.g., glass or polycarbonate transparent material including one or more polarized layers).

The first panel 34 is overlaid on the second panel 38 so that the panels 34 and 38 overlap and both intersect the path of light incident on the vehicle 10. The polarization patterns are selected such that moving one panel in a linear direction (i.e., linearly translating) relative to another panel changes the opacity of the polarization assembly 32. An opacity of the polarization assembly 32 is thus adjustable by changing the position of the first panel 34 relative to the second panel 38.

In the embodiment of FIG. 1, opacity can be controlled or adjusted by moving the first panel 34 in a linear direction 42 while the second panel 38 is stationary, or vice versa. An actuator 44 is operably connected to the first panel 34 and/or the second panel 38 to move the first panel 34 and/or the second panel 38 to change the relative position of the panels 34 and 38. The actuator 44 may be controlled manually (e.g., by a handle or cable engageable by a driver or passenger), or may be controlled by a control device such as a controller 46.

In an embodiment, the polarization patterns are selected so that when the panels 34 and 38 are in a first relative position, the first polarization pattern aligns with the second polarization pattern, and the polarization assembly 32 is transparent. When the panels 34 and 38 are in the first relative position, the panels are fully aligned and the assembly 32 is in a "transparent state." One or both panels can be moved linearly to a second relative position in which the panels 34 and 38 are fully unaligned, such that first pattern is orthogonal to the second pattern and light is fully or substantially blocked. When the panels 34 and 38 are in the second relative position, the assembly 32 is in an "opaque state." It is noted that the panels can be moved to one or more intermediate states, in which light is partially blocked.

Each set of polarized material and/or polarizing element may be made from any suitable material or combination of materials. For example, a polarized element may include a layer or sheet of a transparent material (e.g., glass or plastic) or a combination of layers.

Figure 2A:
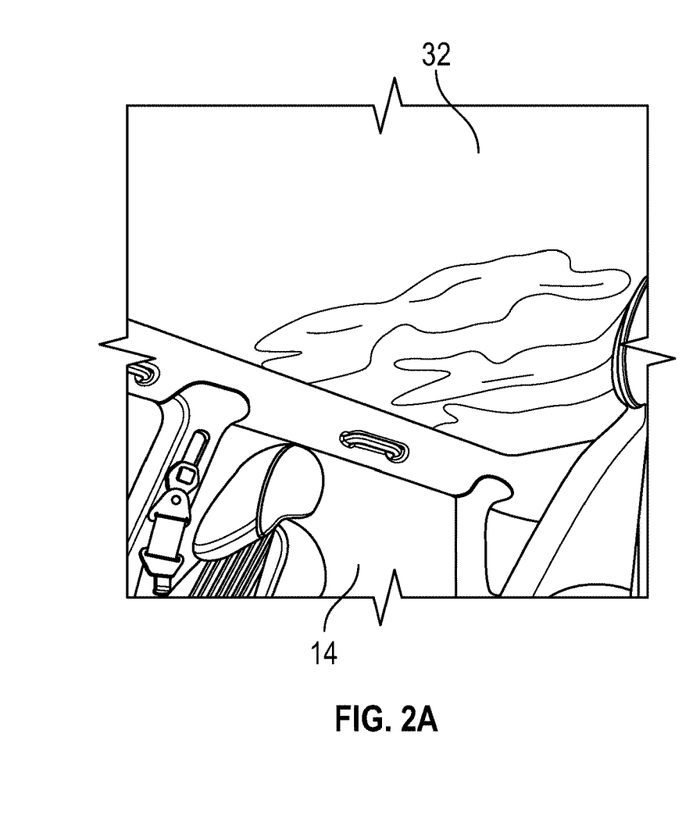
FIGS. 2A and 2B depict the polarization assembly of FIG. 1 in a transparent state and an opaque state, in accordance with an exemplary embodiment.
Figure 2B:
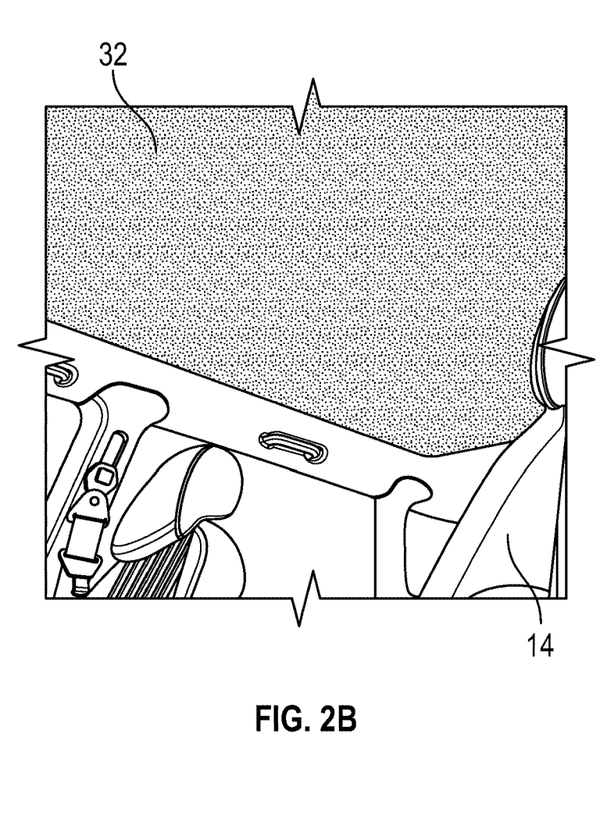

FIGS. 2A and 2B show an example of two states. In this example, the polarization assembly 32 forms all or part of a roof of the vehicle 10; however, the polarization assembly 32 may form all or part of any suitable vehicle component, such as a window or side panel. When the panels 34 and 38 are aligned and in the first relative position, the polarization assembly 32 is transparent, as shown in FIG. 2A. The polarization assembly 32 can be controlled to put the panels 34 and 38 in the second relative position, so that the polarization assembly 32 is in an opaque state as shown in FIG. 2B. In the opaque state, each first element 36 is overlaid on a second element 40 that has an orthogonal polarization direction.

Figure 3:
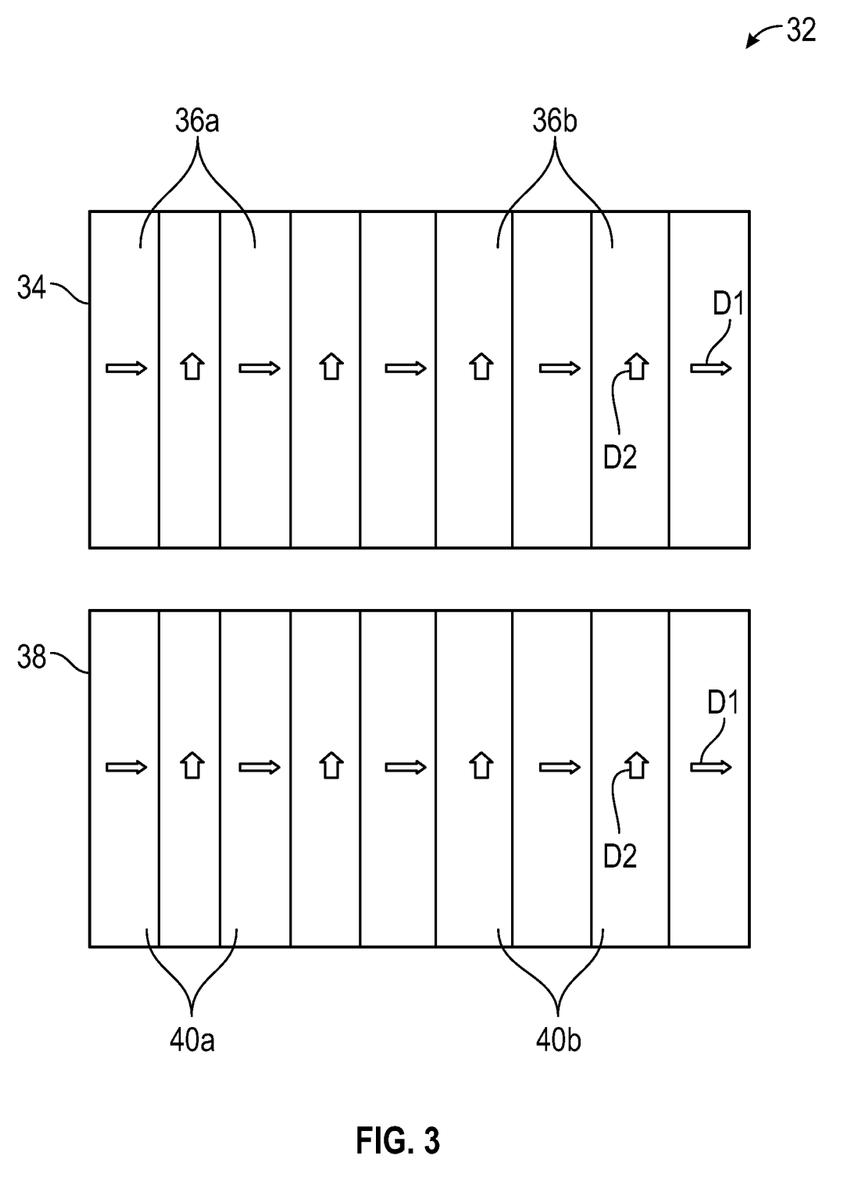
FIG. 3 depicts a polarization assembly of a vehicle illumination control system, in accordance with an exemplary embodiment, the polarization assembly in a transparent state, in accordance with an exemplary embodiment.

FIG. 3 shows the relative position of the first panel 34 and the second panel 38 when the polarization assembly 32 is in the transparent state. In this example, the elements 36 of the first panel 34 are arrayed in an alternating pattern. Elements 36a have a polarization direction D1, and elements 36b have a polarization direction D2 that is perpendicular to the direction D1.

The elements 40 of the second set 38 include elements 40a having the polarization direction D1, and elements 40b having the polarization direction D2. The elements 36a, 36b, 40a and 40b all have the same width in the direction D1.

In this state, elements 36a are directly overlaid or on top of elements 40a, and elements 36b are directly overlaid on elements 40b (i.e., an offset is zero). As the polarizations are aligned, light is allowed to pass through.

Figure 4:
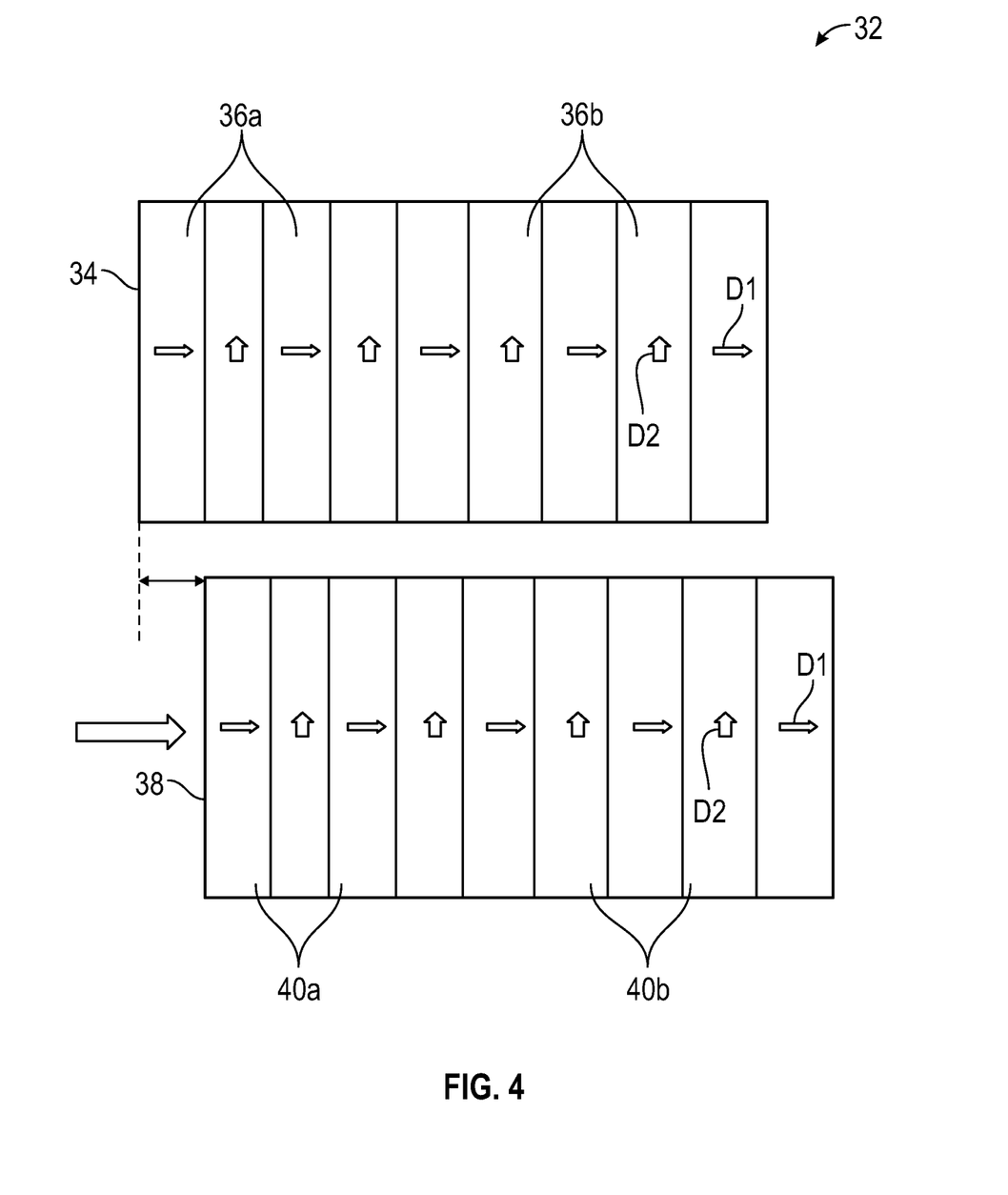
FIG. 4 depicts the polarization assembly of FIG. 3 in an opaque state.

FIG. 4 shows the relative position of the first panel 34 and the second panel 38 when the polarization assembly 32 is in the opaque state. In this state, the second panel 38 has been shifted or offset relative to the first panel 34 (in the direction D1) by an offset distance OD.

The elements 40 of the second panel 38 include elements 40a having the polarization direction D1, and elements 40b having the polarization direction D2. The elements 36a, 36b, 40a and 40b all have the same width in direction D1.

In the opaque state, elements 36b are directly overlaid or on top of elements 40a, and elements 36a are directly overlaid on elements 40b. As the polarizations are not aligned, light is blocked.

In this example, the second panel 38 is offset so that the polarization assembly 32 is completely opaque (i.e., the offset distance OD is at least substantially equal to the width of the elements 36 and 40). In an embodiment, the panels 34 and 38 can be offset to various extents to provide partial opacity. For example, the panels 34 and 38 can be offset by an intermediate distance in which the offset distance OD is less than the width of the elements 36 and 40. When such an offset is applied, the polarization assembly 32 forms sections that alternate between transparent and opaque.

Figure 5A:
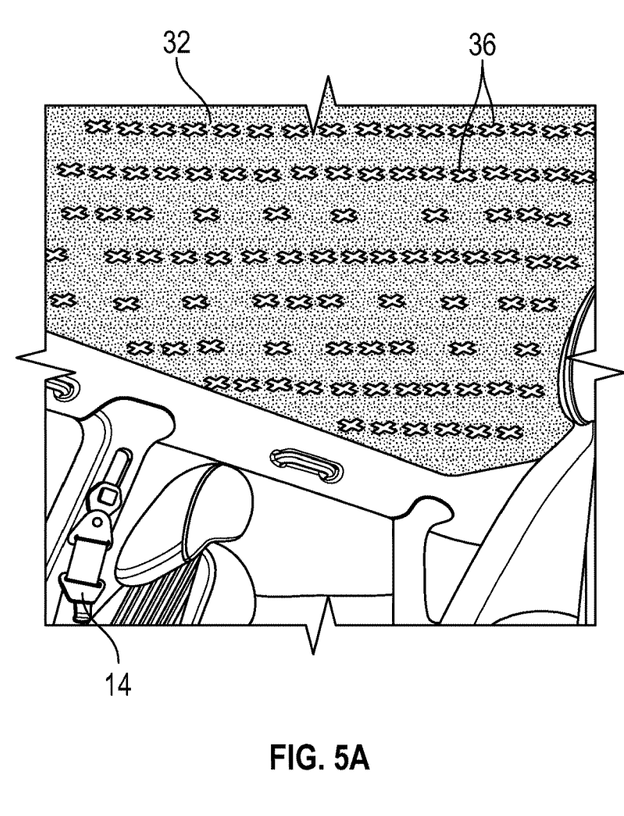
FIGS. 5A and 5B depict a polarization assembly of a vehicle illumination control system in a transparent state and an opaque state, in accordance with an exemplary embodiment.
Figure 5B:
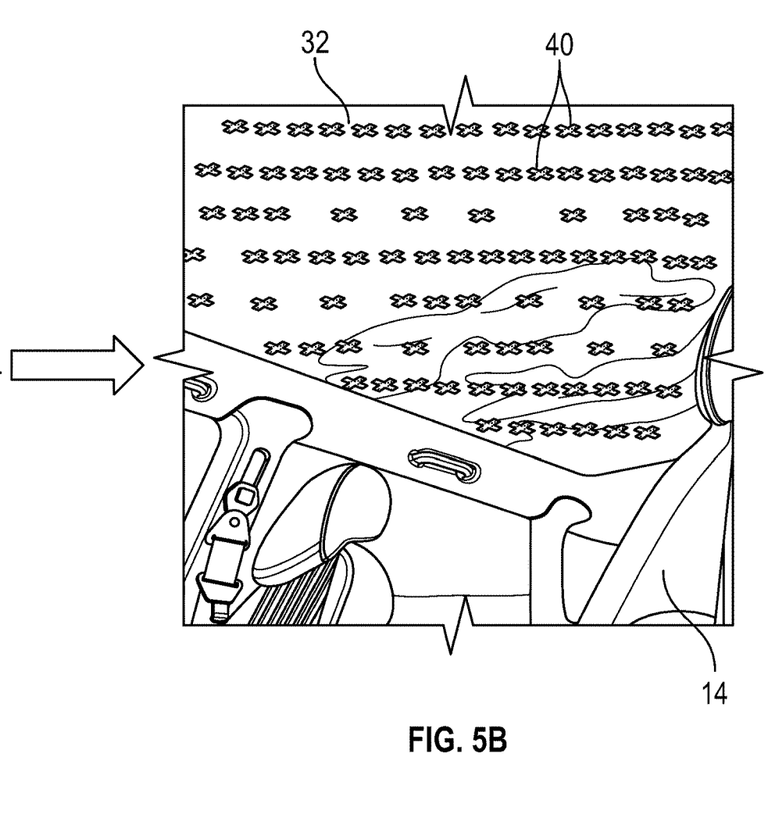

Any of a variety of shapes and patterns can be used to provide functionality of the illumination control system 30 to adjust opacity. Thus, the system 30 is not limited to the specific patterns and shapes discussed herein. FIGS. 5A and 5B show an example of a pattern of the elements. In this example, at least some of the elements 36 and 40 have a shape as shown, and are referred to as shaped elements. The polarization of the shaped elements 36 is perpendicular or orthogonal to the polarization of the shaped elements 40. FIG. 5A shows the assembly 32 in the opaque state in which the shaped elements 36 are fully offset from the shaped elements 40, and FIG. 5B shows the assembly in a partially opaque or intermediate state.

As noted herein, any suitable actuating or translating mechanism or device may be used to transition the assembly 32 between various opacity states. Examples of actuators include linear actuators, motors, manual actuators and others. FIGS. 6A-6D depict examples of an actuator, which may be used as the actuator 44 of FIG. 1. In the following examples, a single element 36 of the first panel 34 is shown, and a single element 40 of the second panel 38 is shown for illustration purposes; however, it is noted that the actuator may be configured to move multiple elements of a panel simultaneously.

Also in the following examples, the actuator is configured to move the element 40 (or elements of the second panel 38) while the element 36 (or elements of the first panel 34) remains stationary. The examples are not so limited, as the actuator can be configured to move the second element 40 while the first element 36 is stationary, or move both elements.

Figure 6A:
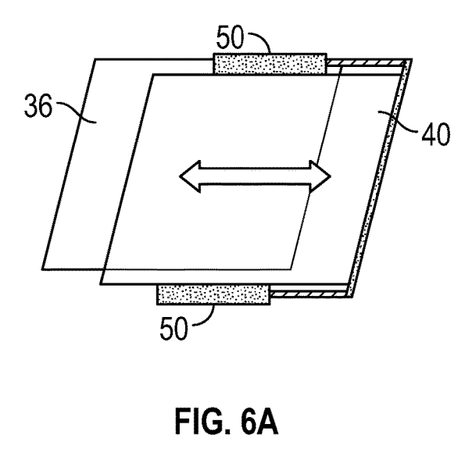
FIGS. 6A-6D depict exemplary embodiments of an actuator of the polarization assembly of FIG. 1.
Figure 6B:
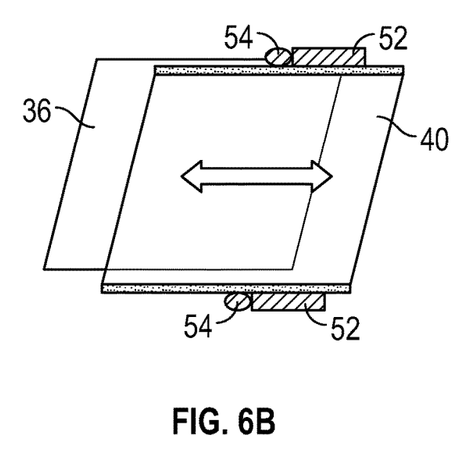

FIG. 6A shows an example in which the actuator includes linear or piezoelectric actuators 50 on opposing sides of the element 40. FIG. 6B shows a rack and pinion type actuator which includes a rack and pinion 52 on opposing sides that are driven by pinion motors 54.

Figure 6C:
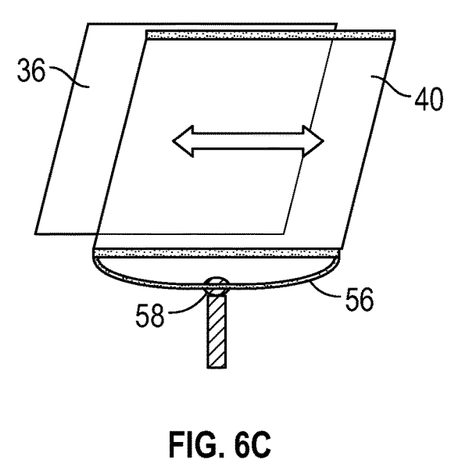
Figure 6D:
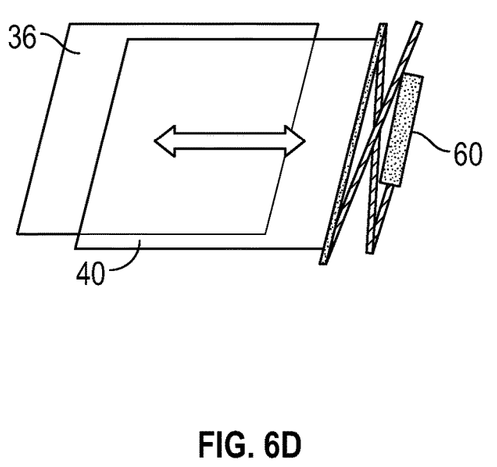

In the example of FIG. 6C, the element 40 is moveable via a cable 56 attached to a motor 58. In the example of FIG. 6D, a scissor actuator 60 is provided for linear translation of the element 40.

Figure 7:
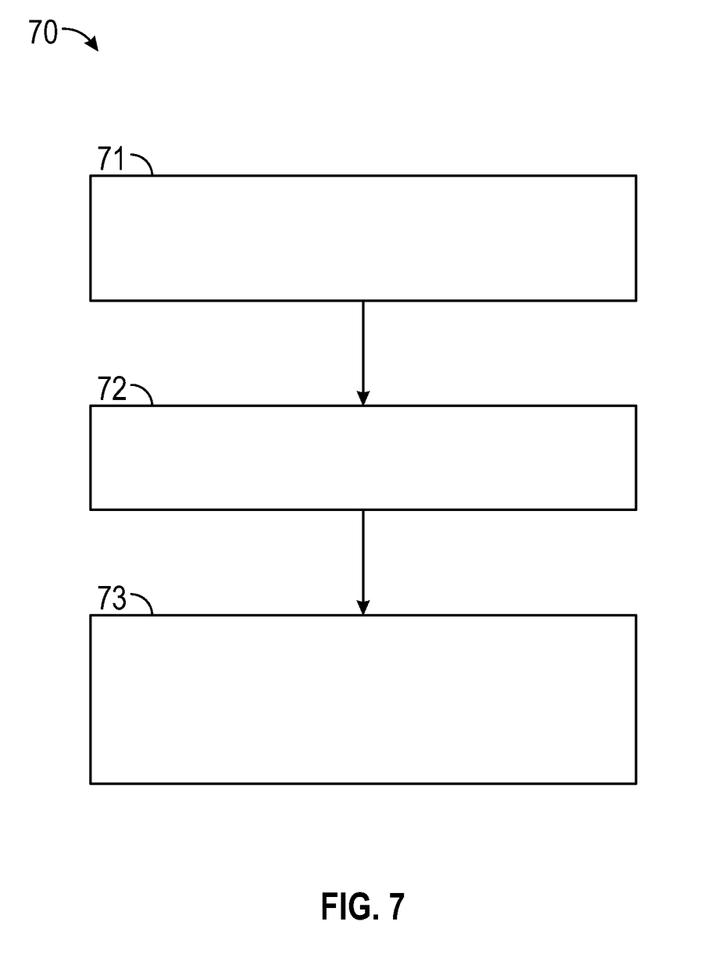
FIG. 7 is a flow diagram depicting aspects of a method of controlling illumination, in accordance with an exemplary embodiment.

FIG. 7 illustrates embodiments of a method 70 of operating an illumination control system and controlling opacity of a portion of a vehicle. Aspects of the method 70 may be performed manually by a driver or passenger, and/or by a processor or processors disposed in a vehicle. For example, aspects of the method may be performed by the controller 46 or computer system 80, but are not so limited, as aspects of the method 70 may be performed by any other suitable processing device or system, or combination of processing devices. In addition, the method 70 is discussed in conjunction with the illumination control system 30 of the vehicle 10, but is not so limited.

The method 70 includes a number of steps or stages represented by blocks 71-73. The method 70 is not limited to the number or order of steps therein, as some steps represented by blocks 71-73 may be performed in a different order than that described below, or fewer than all of the steps may be performed.

At block 71, the polarization assembly 32 is initially placed in a first desired state. The first desired state may be an opaque state in which the first panel 34 is offset from the second panel 38, a transparent state in which the first panel 34 is aligned with the second panel 38 (OD equals zero) or an intermediate state.

At block 72, one or more sensors are used to monitor one or more conditions of the vehicle 10. For example, temperature measurements may be performed to determine a temperature in the compartment 14. One or more light sensors may be used to estimate an amount of light (illumination level) entering the vehicle 10.

At block 73, the polarization assembly 32 is controlled to transition to another state. This may be performed manually by a driver or passenger, either by using a handle or other mechanism for manually controlling the actuator 44, or by instructing the controller 46 to operate the actuator 44. For example, if a user desires, or a temperature or illumination level is undesirable, the first panel 34 and/or the second panel 38 is linearly translated.

In an embodiment, the state transition is performed automatically by the illumination control system 30 in response to a vehicle condition. For example, if a light sensor detects a level of illumination above a threshold or a temperature sensor detects heat above a threshold, the control system 30 can respond by moving from a transparent state to an opaque state.

Figure 8:
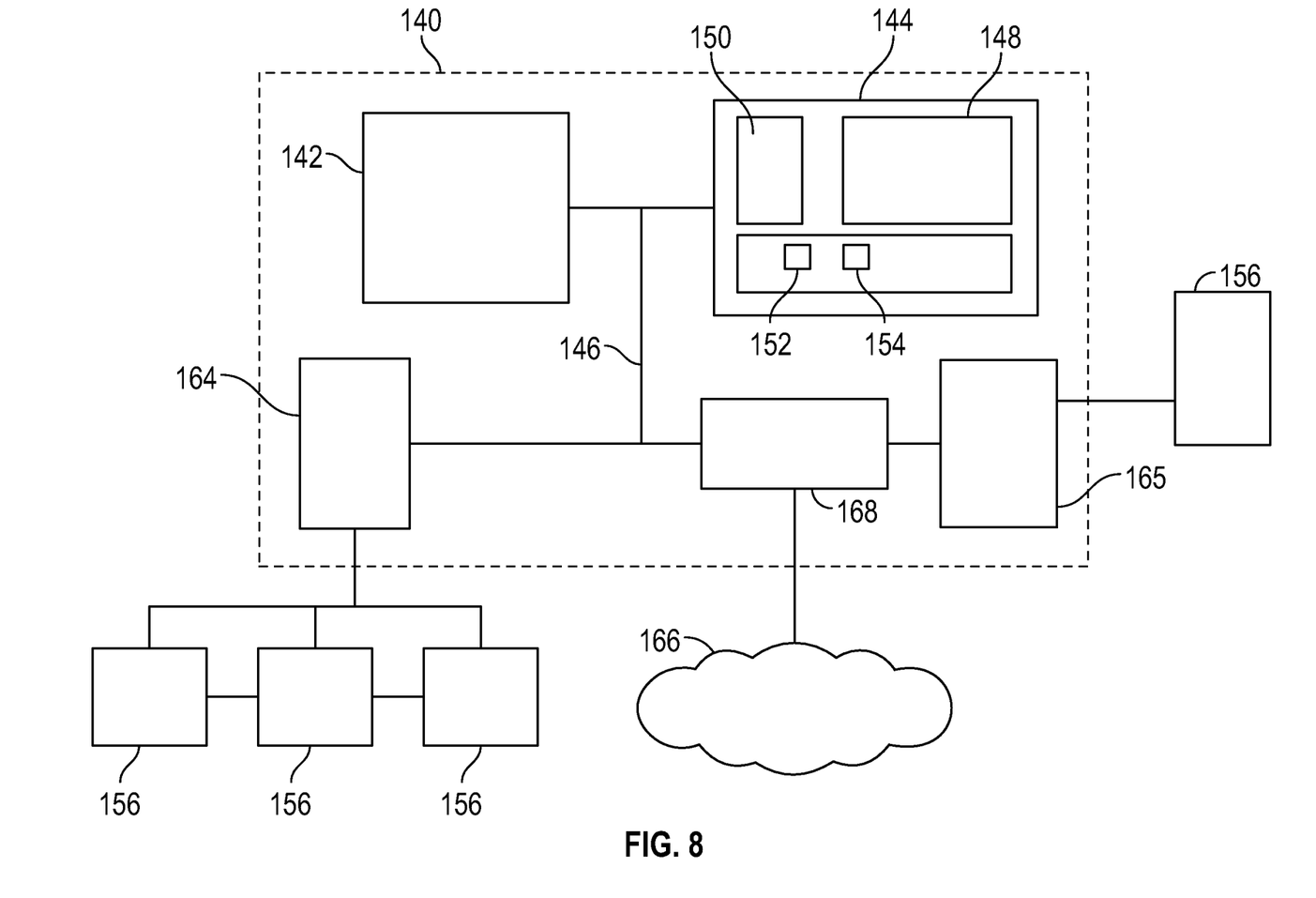
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring conditions, and a module 154 may be included to perform functions related to controlling opacity and illumination as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for providing variable opacity, comprising:
a light sensor configured to detect a level of illumination;
a polarization assembly disposed at a vehicle, the polarization assembly including:
   a first panel having a plurality of first polarizing elements; and
   a second panel having a plurality of second polarizing elements, the first panel and the second panel overlapping in a path of light incident on the vehicle; and
an actuation device configured to linearly translate the first panel relative to the second panel between a first position in which the polarization assembly is transparent to the light and a second position in which the polarization assembly at least partially blocks the light; and
a processing device configured to control the actuation device to move at least one of the first panel and the second panel based on the detected level of illumination.

2. The system of claim 1, wherein the plurality of first polarizing elements defines a first polarization pattern, and the plurality of second polarizing elements defines a second polarization pattern, each of the first polarization pattern and the second polarization pattern including a first polarization and a second polarization perpendicular to the first polarization.

3. The system of claim 2, wherein:
the first polarization pattern fully aligns with the second polarization pattern when the polarization assembly is in the first position; and
the polarization assembly entirely blocks the light, and the first polarization pattern is fully unaligned with the second polarization pattern, when the polarization assembly is in the second position.

4. The system of claim 3, wherein the actuation device is configured to perform the linear translation to put the polarization assembly in an intermediate position in which the first polarization pattern partially aligns with the second polarization pattern, and the polarization assembly partially blocks the light.

5. The system of claim 2, wherein each of the first polarization pattern and the second polarization pattern alternates between the first polarization and the second polarization.

6. The system of claim 2, wherein each of the first polarization pattern and the second polarization pattern alternates between the first polarization and the second polarization in a direction parallel to a direction of the linear translation.

7. The system of claim 1, wherein the actuation device is configured to control an amount of the light passing through the polarization assembly based on an offset between the first panel and the second panel, the offset being in a direction parallel to a direction of the linear translation.

8. The system of claim 1, wherein the processing device is configured to control the actuation device based on at least one of: an input by a user, and an input by a vehicle system.

9. The system of claim 1, wherein each of the first panel and the second panel is made from a transparent material, and each of the first panel and the second panel is individually transparent to the light.

10. The system of claim 1, wherein the polarization assembly is configured to be disposed at a roof section of the vehicle.

11. A method of providing variable opacity, comprising:
detect a level of illumination by a light sensor;
controlling a polarization assembly disposed at a vehicle, the polarization assembly including a first panel having a plurality of first polarizing elements, and a second panel having a plurality of second polarizing elements, the first panel and the second panel overlapping in a path of light incident on the vehicle, wherein the controlling including operating an actuation device to linearly translate the first panel relative to the second panel between a first position in which the polarization assembly is transparent to the light and a second position in which the polarization assembly at least partially blocks the light, wherein the controlling is based on the detected level of illumination.

12. The method of claim 11, wherein the plurality of first polarizing elements defines a first polarization pattern, and the plurality of second polarizing elements defines a second polarization pattern, each polarization pattern including a first polarization and a second polarization perpendicular to the first polarization.

13. The method of claim 12, wherein:
the first polarization pattern fully aligns with the second polarization pattern when the polarization assembly is in the first position; and
the polarization assembly entirely blocks the light, and the first polarization pattern is fully unaligned with the second polarization pattern, when the polarization assembly is in the second position.

14. The method of claim 12, wherein each polarization pattern alternates between the first polarization and the second polarization.

15. The method of claim 11, wherein the controlling is performed based on at least one of: an input by a user, and an input by a vehicle system.

16. The method of claim 11, wherein the polarization assembly is disposed at a roof section of the vehicle.

17. A vehicle system, comprising:
a light sensor configured to detect a level of illumination;
a polarization assembly disposed at a vehicle, the polarization assembly including:
   a first panel having a plurality of first polarizing elements; and a second panel having a plurality of second polarizing elements, the first panel and the second panel overlapping in a path of light incident on the vehicle;

an actuation device configured to linearly translate the first panel relative to the second panel between a first position in which the polarization assembly is transparent to the light and a second position in which the polarization assembly at least partially blocks the light; and a processing device configured to control the actuation device to move at least one of the first panel and the second panel based on the detected level of illumination.

18. The vehicle system of claim 17, wherein the plurality of first polarizing elements defines a first polarization pattern, and the plurality of second polarizing elements defines a second polarization pattern, each polarization pattern including a first polarization and a second polarization perpendicular to the first polarization.

19. The vehicle system of claim 18, wherein:
the first polarization pattern fully aligns with the second polarization pattern when the polarization assembly is in the first position; and
the polarization assembly entirely blocks the light, and the first polarization pattern is fully unaligned with the second polarization pattern, when the polarization assembly is in the second position.

20. The vehicle system of claim 18, wherein each polarization pattern alternates between the first polarization and the second polarization.

* * * * *